United States Patent [19]

Berry

[11] 4,190,375

[45] Feb. 26, 1980

[54] FASTENING DEVICE

[75] Inventor: George A. Berry, Ashwell, England

[73] Assignee: International Computers Limited, London, England

[21] Appl. No.: 813,518

[22] Filed: Jul. 7, 1977

[30] Foreign Application Priority Data

Jul. 23, 1976 [GB] United Kingdom ............... 30714/76

[51] Int. Cl.² ............................................. F16B 7/00
[52] U.S. Cl. .......................................... 403/7; 403/12; 403/187; 403/260
[58] Field of Search ............... 403/187, 190, 258, 260, 403/264, 7, 297, 2, 234, 235, 237, 200, 409, 12; 85/79, 75, 72, 86, 87

[56] References Cited

U.S. PATENT DOCUMENTS

| 2,647,000 | 7/1953 | Colley | 403/237 |
|---|---|---|---|
| 2,753,750 | 7/1956 | Dempsey | 85/87 |
| 3,051,517 | 8/1962 | Yalen | 403/297 |
| 3,175,455 | 3/1965 | Reddy | 85/75 |
| 3,342,097 | 9/1967 | Rocheleau | 85/79 |
| 3,427,919 | 2/1969 | Lerich | 85/72 |
| 3,478,641 | 11/1969 | Dohmeier | 85/79 |
| 3,713,677 | 1/1973 | DuPreez | 403/237 |
| 3,844,194 | 10/1974 | Reinwall, Jr. | 85/79 |
| 3,974,621 | 8/1976 | Stang | 85/79 |

Primary Examiner—Andrew V. Kundrat
Attorney, Agent, or Firm—Hane, Roberts, Spiecens & Cohen

[57] ABSTRACT

A fastening device is disclosed for joining two members, for example tubular members, together, one of the members having a recess in an end which is to abut the other member. The device includes wedge elements which are moved relative to one another to engage opposed internal walls of the recess in the one member so that by attaching one of the wedge elements to the other member the members are secured to one another. Deformable links interconnect the wedge elements to initially retain the elements in their operative positions but to subsequently deform when relative movement is produced between the elements.

6 Claims, 5 Drawing Figures

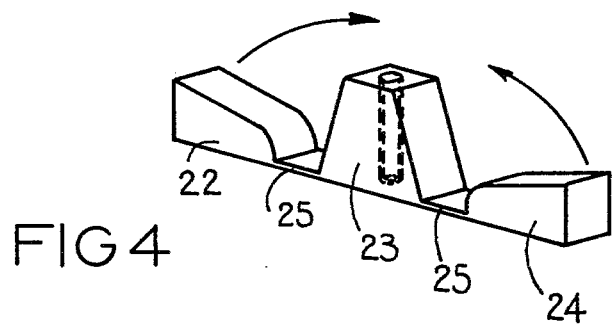
FIG 4
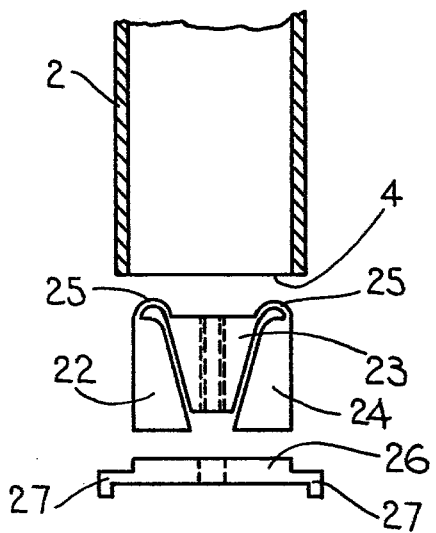
FIG 5
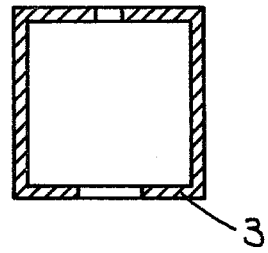

FASTENING DEVICE

This invention relates to a fastening device for joining two members arranged at an angle to each other, and of which one has a cavity or recess in an end which is to abut the other element.

In particular the invention is concerned with an arrangement for interconnecting tubular members arranged at an angle to each other, with one of the members abutting the other.

SUMMARIES OF THE INVENTION

According to a first aspect of the invention a fastening device includes at least two wedge elements each having a narrow and a wide end and a sloping face extending therebetween; and a deformable connection between the elements effective to permit the elements to be disposed with said sloping faces abutting one another and to permit sliding action between the elements.

According to a second aspect of the invention a structure includes a fastening device as claimed in Claim 1; and first and second members; and in which said first member having a recess therein with opposed internal walls is positioned in abutment with the second member; the structure further including means for securing one of the wedge elements to the second member in a position such that the elements enter into the recess of the first member when the members are abutted; and means for producing relative movement between the wedge elements to cause a wedging action to take place, the wedging action being effective to urge at least two of the elements into engagement with said opposed internal walls of said recess to thereby secure the first member to the second member; said deformable connection initially retaining the elements in their operative positions to facilitate abutment of the members but subsequently deforming when relative movement is produced between the elements.

BRIEF DESCRIPTION OF DRAWING

For a better understanding of the invention reference will now be made to the accompanying drawings in which.

FIG. 4 is a view of a second form of the device of the invention, and

FIG. 5 is an exploded part sectional view of an early stage in the installation of the device of FIG. 4 for connecting two tubular members.

DESCRIPTION OF PREFERRED EMBODIMENTS

Figure 1:
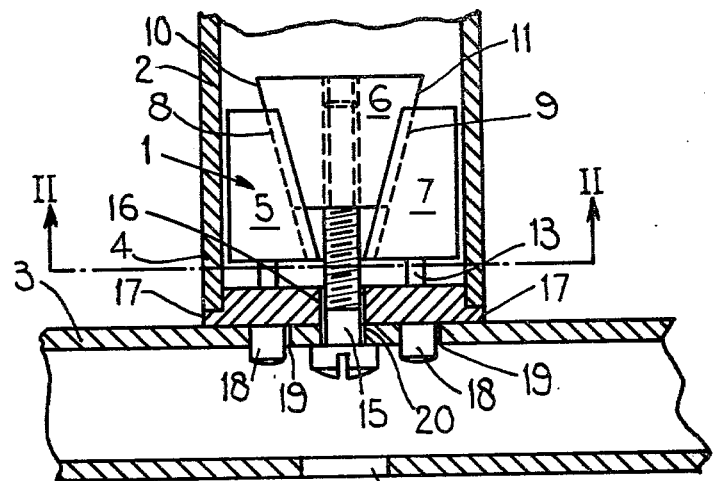
FIG. 1 is a cross-sectional view illustrating a first form of the device of the invention in the process of being installed so as to connect two rectangular cross section tubes.
Figure 2:
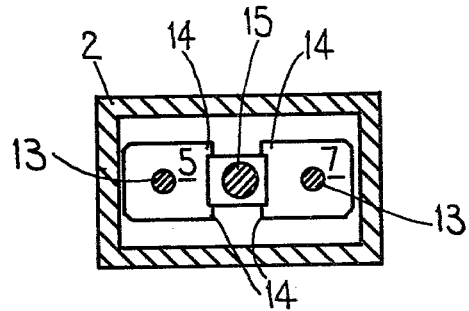
FIG. 2 is a sectional view on the line II — II of FIG. 1.
Figure 3:
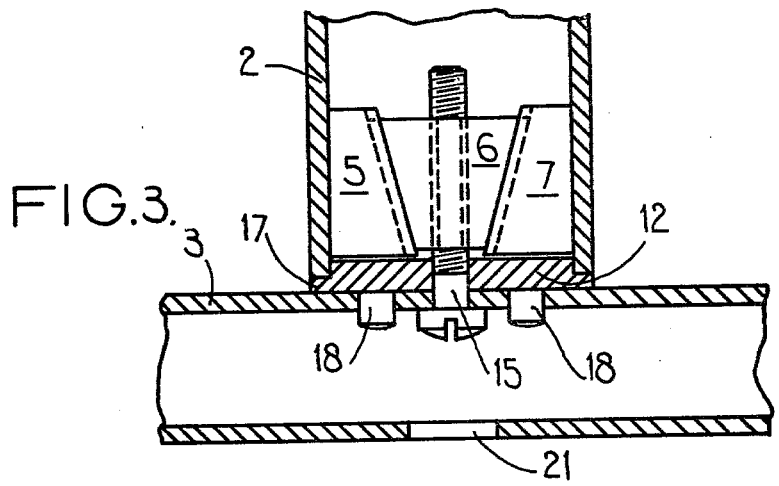
FIG. 3 is a view similar to FIG. 1 illustrating the device after installation.

Referring now to FIGS. 1, 2, and 3, a device 1 of the invention is shown interconnecting two tubular members 2 and 3 of rectangular cross section such that the end 4 of one member 2 butts onto the body of the other member 3. The device includes three wedge elements 5, 6 and 7, of which the outer elements 5, and 7 are similar and each have a single inclined or wedge surface 8, 9, which are oppositely inclined to the vertical, and of which the central element 6 has two oppositely inclined wedges surfaces 10, 11. The surfaces 10 and 11 are intended as shown to cooperate with the surfaces 8 and 9 respectively.

The elements 5 and 7 are connected to a base plate 12 by way of frangible pegs 13, so that the elements normally have the position shown in FIG. 1. Since the sole function of the pegs is to temporarily retain the elements 5 and 7 in position during initial abutment of the tubes the pegs 13 are as small as constructionally possible. Each element 5 and 7 has ribs 14, which extend lengthwise of the inclined faces 8, 9, to define locating guides for the central element 6. The latter has a central screw threaded bore, which is intended to receive a bolt 15 which freely engages a bore 16 in the base plate 12. The plate 12 has a lip 17 which is designed to act as a seating for the end 4 of the member 2. In otherwords the peripheral shape of the base plate is formed to correspond to the outline of the face of the end 4 of the tube to be butt joined against a second tube 3.

The base plate 12 has two locating pins 18 which are intended to locate in and also firmly engage in two locating apertures 19 formed in the tubular member 3.

The tubular member 3 against which a member 2 is to butt has to be provided with a line of three apertures 19, 19, 20 at the position of the joint, the apertures 19 for receiving the pins 18 and the central remaining aperture 20 is of a clearance size for the shank but not the head of the bolt 15. A further aperture 21 is provided in the wall of the tubular member 3 the aperture 21 being a clearance size for the head of the bolt 15.

The device is used as follows. The bolt 15 is entered into the tubular member 3 through the aperture 21 so that the shank thereof projects through the aperture 20. The base plate 12 is engaged with the bolt and the bolt is threadably engaged with the centre wedge element 6. The bolt 15 is tightened sufficiently to hold the wedge element 6 in place with the location pins 18 engaged in the apertures 19.

The end 4 of the tubular member — is engaged over the device 1 such that the end 4 rests on and thus locates with the lip 17 on the base plate 12. The bolt 15 is then tightened. This tightening action pulls the central wedge element 6 towards the base plate 12. Ultimately the outer wedge elements 5 and 7 are forced outwards to lock against the internal walls of the tube end 4. Following the initial locking further tightening of the bolt continues to exert lateral pressure against the outer elements — ultimately breaking or deforming the frangible pins 13 whereby the outer wedge elements move bodily firmly to lock with the tube member 2.

The final position of the elements of the device are indicated in FIG. 3, (the remnants of the pins 13 being omitted).

A second form of the invention is shown in FIG. 4 and 5. As can be seen the second form of the invention once again includes three wedge elements 22, 23, 24 which are connected together by flexible webs 25. A separate apertured base plate unit 26 is provided and is adapted to engage the open end 4 of the member 2 (FIG. 5) and also has flanges 27 which locate the plate unit 26 on the other tubular member 3. The plate unit 26 serves also to maintain relative alignment of the tubular members 2 and 3, in that it prevents the element 2 from twisting relative to the element 3. To use the device of FIGS. 4 and 5, the side wedge elements 22, 24 are folded to lie against the central element 23, and the device is inserted into the end 4 of the tubular machine 2. The plate unit 26 is engaged in the tube end 4 and is placed against the other tube 3. The bolt 15 is engaged with the wall of the tubular member 3, the base unit 26 and the central element 23.

The bolt is tightened to pull the element 23 relative to the elements 22, 24 to create the wedge locking action which holds the tubular members together.

During this locking movement the webs may be deformed, for example, either by fracturing or stretching according to their elastic characteristics.

It will be understood that the use of the invention is not restricted to rectangular section tubular members, and can be used with members of other cross-sections i.e. circular, eliptical, triangular or combinations of cross-sections. In such situations those surfaces of the wedge elements which engage with the tubular members are shaped accordingly. Furthermore, the respective base plates will likewise be accordingly shaped so as to be able to seat firmly on the associated tubular member.

The devices of the invention can be made from any suitable material having the required physical properties of being able to withstand the pressures produced by the wedging action and pull of a tightened bolt on a thread provided in the wedge element which is engaged by the bolt. Thus the devices can be formed from metal, rigid plastics material, laminates of plastics and other materials.

In the case of the embodiment of FIGS. 4 and 5 the flexible webs do not necessarily have to be formed integrally with the remainder of the wedge elements 22, 23, 24 since the webs 25 can be produced by attaching a length of fabric or plastics material to the elements. Such a material can be adhesive plastics strip such as frequently used for binding electrical cables or the like.

In a further arrangement not shown, the device can comprise two wedging elements, of which one is apertured to receive the bolt.

If desired any of the above mentioned embodiments can be provided with a captive bolt which is long enough to project into the element to which that element containing the device of the invention is to be attached, so as to receive a nut which, on tightening, produces the wedging action.

I claim:

1. A fastening device including at least two wedge elements each having a narrow and a wide end and a sloping face extending therebetween; and a deformable connection between the elements effective to permit the elements to be disposed with said sloping faces abutting one another and to permit sliding action between the elements, the deformable connection including a base plate, a frangible peg securing the wide end of at least one of said elements to the base plate, and means for connecting the narrow end of the other element to the base plate and for moving said other element towards the base plate to produce the sliding action between the elements.

2. A structure including a fastening device as claimed in claim 1; a first member having a recess therein with opposed internal walls; and a second member abutting the recess in said first member; the wedge elements lying within the recess and the means for connecting said other wedge element to the base plate also being operative to secure the second member to the fastening device and by movement of the other wedge element to cause the wedge elements to engage the opposed internal walls of the recess in the first member.

3. A structure as claimed in claim 2 including a central wedge element positioned between a pair of outer elements; and means for moving the central element towards the second member to produce said relative movement, such movement being effective to urge the outer elements into engagement with said opposed walls.

4. A fastening device as claimed in claim 1, including a central wedge element movably attached to the base plate at its narrow end and having a pair of opposed sloping faces; a pair of outer wedge elements; and a frangible peg for each outer wedge element securing the respective element to the base plate, the outer elements being disposed with their respective sloping faces abutting one with each of the opposed faces of the central element, the frangible pegs fracturing when the central element is moved towards the base plate to permit sliding action between the elements.

5. A structure as claimed in claim 2 in which the first member is a tube having a hollow end, the hollow end providing said recess.

6. A structure as claimed in claim 5 in which said means for moving the central element towards the second member includes a threaded bolt attaching said central wedge element to said second member, the bolt rotatably engaging the second member and co-operating with a mating thread in the central element whereby rotation of the bolt pulls the central element towards the second member.

* * * * *